US010048444B2

(12) United States Patent
Takahashi

(10) Patent No.: US 10,048,444 B2
(45) Date of Patent: Aug. 14, 2018

(54) OPTICAL SYSTEM FOR OPTICAL COMMUNICATIONS

(71) Applicant: OLYMPUS CORPORATION, Hachioji-shi, Tokyo (JP)

(72) Inventor: Koichi Takahashi, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/478,974

(22) Filed: Apr. 4, 2017

(65) Prior Publication Data
US 2017/0205585 A1 Jul. 20, 2017

Related U.S. Application Data

(63) Continuation of application No. PCT/JP2014/079076, filed on Oct. 31, 2014.

(51) Int. Cl.
G02B 6/34 (2006.01)
G02B 6/02 (2006.01)
(Continued)

(52) U.S. Cl.
CPC .......... G02B 6/34 (2013.01); G02B 6/02042 (2013.01); G02B 6/264 (2013.01); G02B 6/3512 (2013.01); G02B 6/3518 (2013.01); G02F 1/31 (2013.01)

(58) Field of Classification Search
CPC ...... G02B 6/34; G02B 6/3518; G02B 6/3512; G02B 6/02042; G02B 6/264; G02F 1/31
See application file for complete search history.

(56) References Cited

U.S. PATENT DOCUMENTS 5,475,489 A * 12/1995 Gottsche ............... G01D 5/344
324/244.1
2010/0188724 A1 7/2010 Kobayashi et al.
(Continued)

FOREIGN PATENT DOCUMENTS

JP 2008310244 A 12/2008
JP 2013020227 A 1/2013
(Continued)

OTHER PUBLICATIONS

International Search Report (ISR) and Written Opinion dated May 12, 2015 issued in International Application No. PCT/JP2014/079076.
(Continued)

Primary Examiner — John M Bedtelyon
(74) Attorney, Agent, or Firm — Holtz, Holtz & Volek PC

(57) ABSTRACT

An optical system for optical communications includes: a signal light exit portion, a first coupler optical system that collects the signal light, a first collimator optical system that collimates the signal light into a parallel light, an optical signal-operating portion that reflects the parallel light, a second collimator optical system that collects the parallel light reflected, a second coupler optical system that collects signal light, and a signal light-receiving portion that receives the signal light incident, wherein: the first collimator optical system is defined by a decentered optical system that includes a reflective surface that tilts with respect to an optical axis of incident signal light and is capable of reflection, and the second collimator optical system is defined by a second decentered optical system that includes a reflective surface that tilts with respect to an optical axis of incident signal light and is capable of internal reflection.

24 Claims, 7 Drawing Sheets

(51) Int. Cl.
G02B 6/26 (2006.01)
G02B 6/35 (2006.01)
G02F 1/31 (2006.01)

(56) References Cited

U.S. PATENT DOCUMENTS

2012/0328238 A1* 12/2012 Inoue .................. G02B 6/32
                                                                 385/16
2015/0241690 A1    8/2015 Matsumoto et al.
2015/0378104 A1   12/2015 Takahashi
2016/0170149 A1*  6/2016 Modavis .............. G02B 6/2848
                                                                 385/24
2016/0246015 A1*  8/2016 Case ................... G02B 6/4206

FOREIGN PATENT DOCUMENTS

WO    2013088586 A1    6/2013
WO    2014136287 A1    9/2014

OTHER PUBLICATIONS

Koichi Takahashi, "Proposal of the Multi-core fiber coupling method using the Free-form optics," IEICE Technical Report, Aug. 1, 2013, vol. 113, No. 175, pp. 35-40.

* cited by examiner

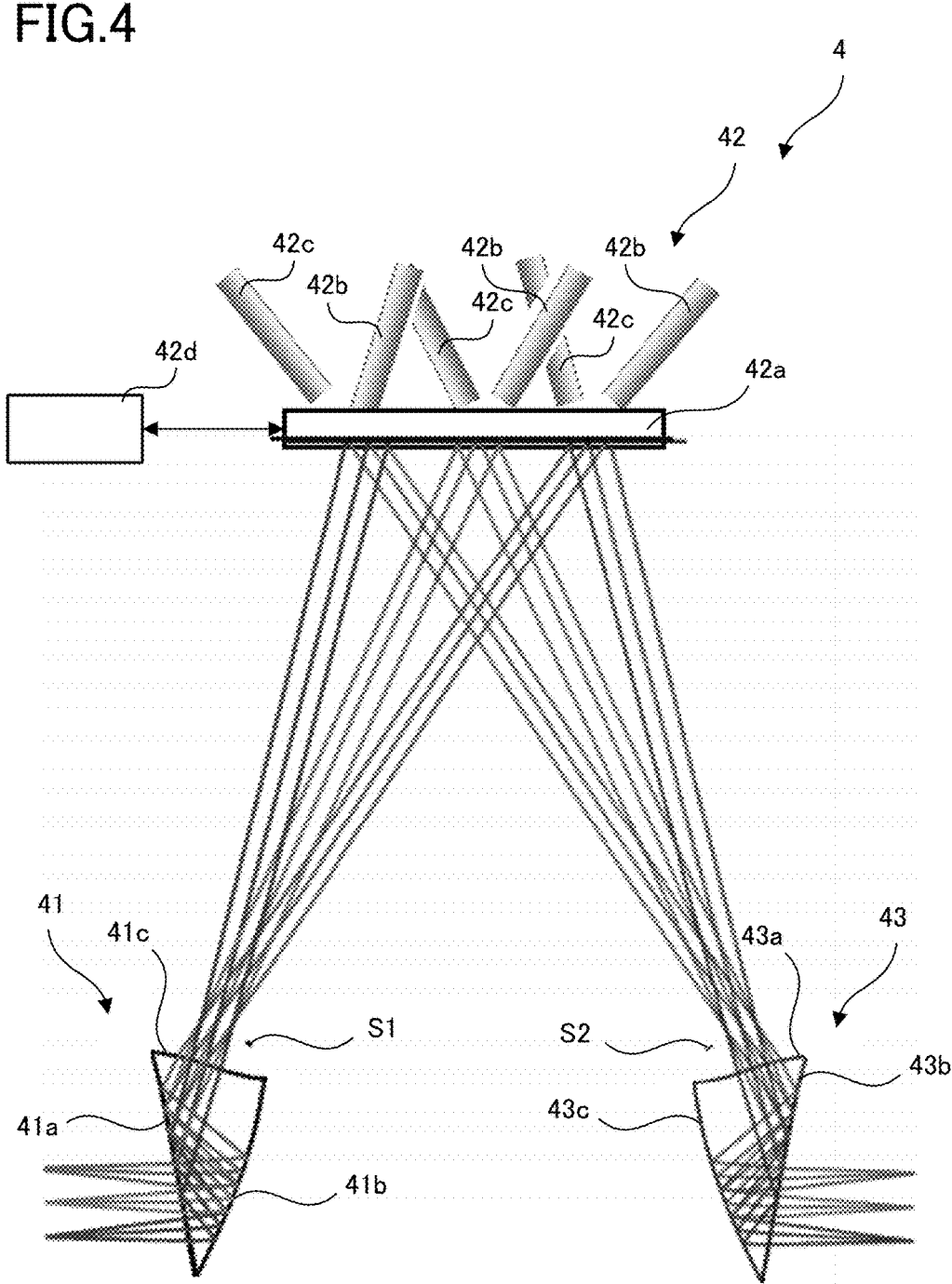

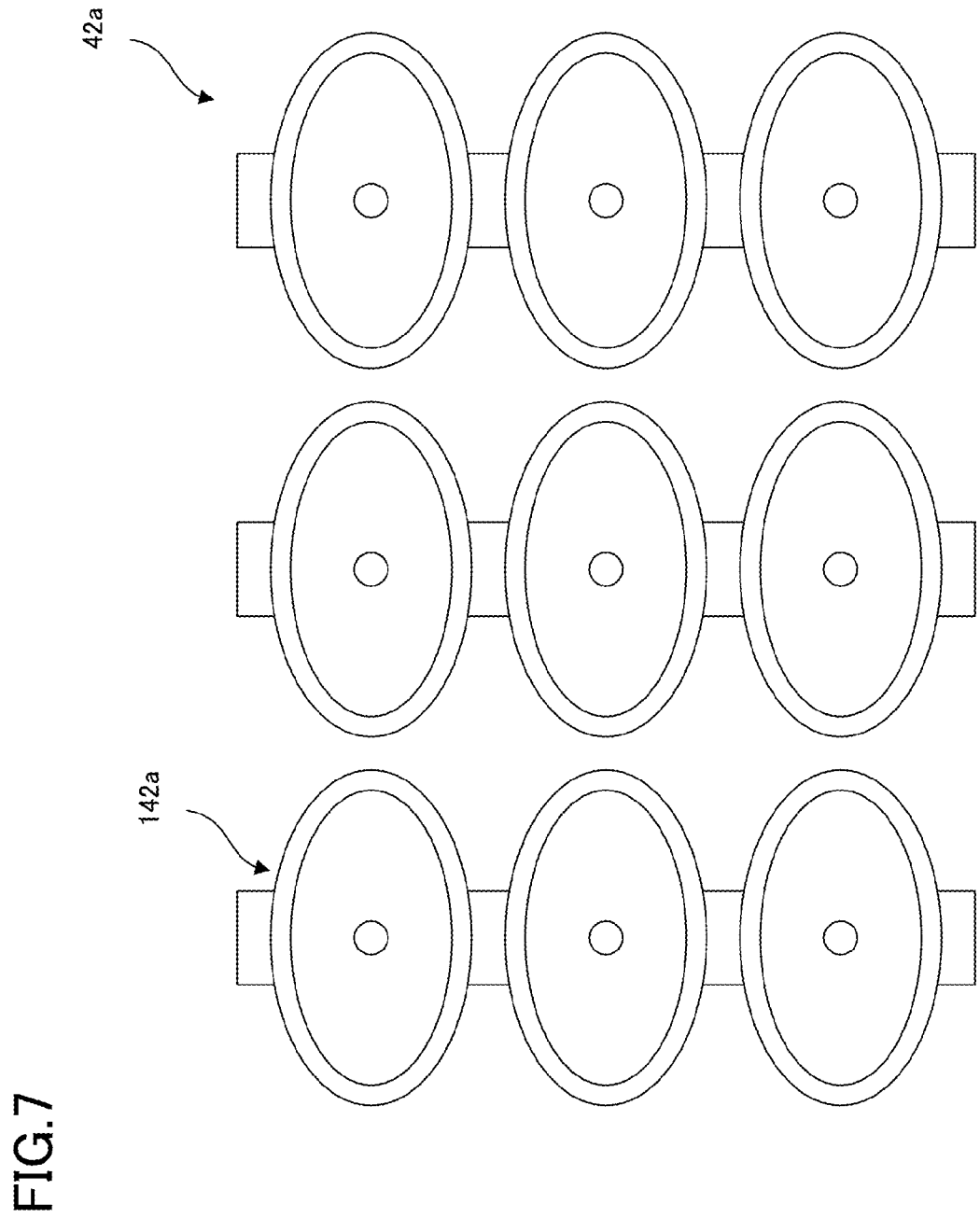

OPTICAL SYSTEM FOR OPTICAL COMMUNICATIONS

CROSS-REFERENCE TO RELATED APPLICATIONS

This application is a continuation claiming priority based on PCT/JP2014/079076 filed on Oct. 31, 2014, the content of which is incorporated herein by reference.

BACKGROUND OF THE INVENTION AND RELATED ART STATEMENT

The present invention relates to an optical system for optical communications that may be applied to spatial multiplex optical communications.

There has so far been an optical apparatus proposed for coupling a multicore fiber to a plurality of single-core fibers.

For instance, JP(A) 2013-20227 discloses an optical apparatus comprising a first optical system S1 that sits on optical axes of a plurality of beams exiting out from a multicore fiber such that the optical axes of the beams are mutually displaced from parallel to space them away from one another, and a second optical system S2 in which the optical axes of a plurality of beams mutually displaced from parallel on the first optical system S1 side are mutually aligned to nearly parallel.

SUMMARY OF INVENTION

According to one embodiment of the invention, an optical system for optical communications includes:

a signal light exit portion having an exit end from which signal light exits out, a first coupler optical system that collects signal light from the exit end to define a first coupling, a first collimator optical system that has positive refracting power and collimates signal light from the first coupling into parallel light, an optical signal-operating portion that includes a optical modulation optical element that at least reflects parallel light exiting out from the first collimator optical system and is capable of operation of optical signals, a second collimator optical system that has positive refracting power and collects parallel light reflected at the optical modulation optical element to define a second coupling, a second coupler optical system that collects signal light from the second coupling to define a third coupling, and a signal light-receiving portion that includes a light-receiving surface in a position of the third coupling defined by the second coupler optical system and receives the signal light incident from the light-receiving surface, wherein:

the first collimator optical system is defined by a decentered optical system that includes a reflective surface that tilts with respect to an optical axis of incident signal light and is capable of reflection, and the second collimator optical system is defined by a second decentered optical system that includes a reflective surface that tilts with respect to an optical axis of incident signal light and is capable of reflection.

According to one embodiment of the invention, an optical system for optical communications includes:

a signal light exit portion having an exit end from which signal light exits out, a first coupler optical system that collects signal light from the exit end to define a first coupling, a first collimator optical system that has positive refracting power and collimates signal light from the first coupling into parallel light, an optical signal-operating portion that includes an optical modulation optical element that at least reflects parallel light exiting out from the first collimator optical system and is capable of operation of optical signals, a second collimator optical system that has positive refracting power and collects parallel light reflected at the optical modulation optical element to define a second coupling, a second coupler optical system that collects signal light from the second coupling to define a third coupling, and a signal light-receiving portion that includes a light-receiving surface in a position of the third coupling defined by the second coupler optical system and receives the signal light incident from the light-receiving surface, wherein:

the signal light exit portion is defined by a first optical fiber that transmits signal light and exits the signal light out from an exit end, the signal light-receiving portion is defined by a second optical fiber that includes an entrance end surface in a position of the third coupling defined by the second coupler optical system and transmits the signal light incident from the entrance end surface, and the optical modulation optical element is defined by an optical element with variable optical characteristics: transmittance and reflectance.

BRIEF DESCRIPTION OF DRAWINGS

FIG. 4 is a sectional view of a first example of a transfer portion according to one embodiment of the invention.

FIG. 7 is illustrative of a second example of an optical modulation optical system according to one embodiment of the invention.

DESCRIPTION OF EMBODIMENTS

A decentered optical system according to one embodiment of the invention, and an image projector apparatus incorporating that decentered optical system is now explained with reference to the accompanying drawings.

Figure 1:
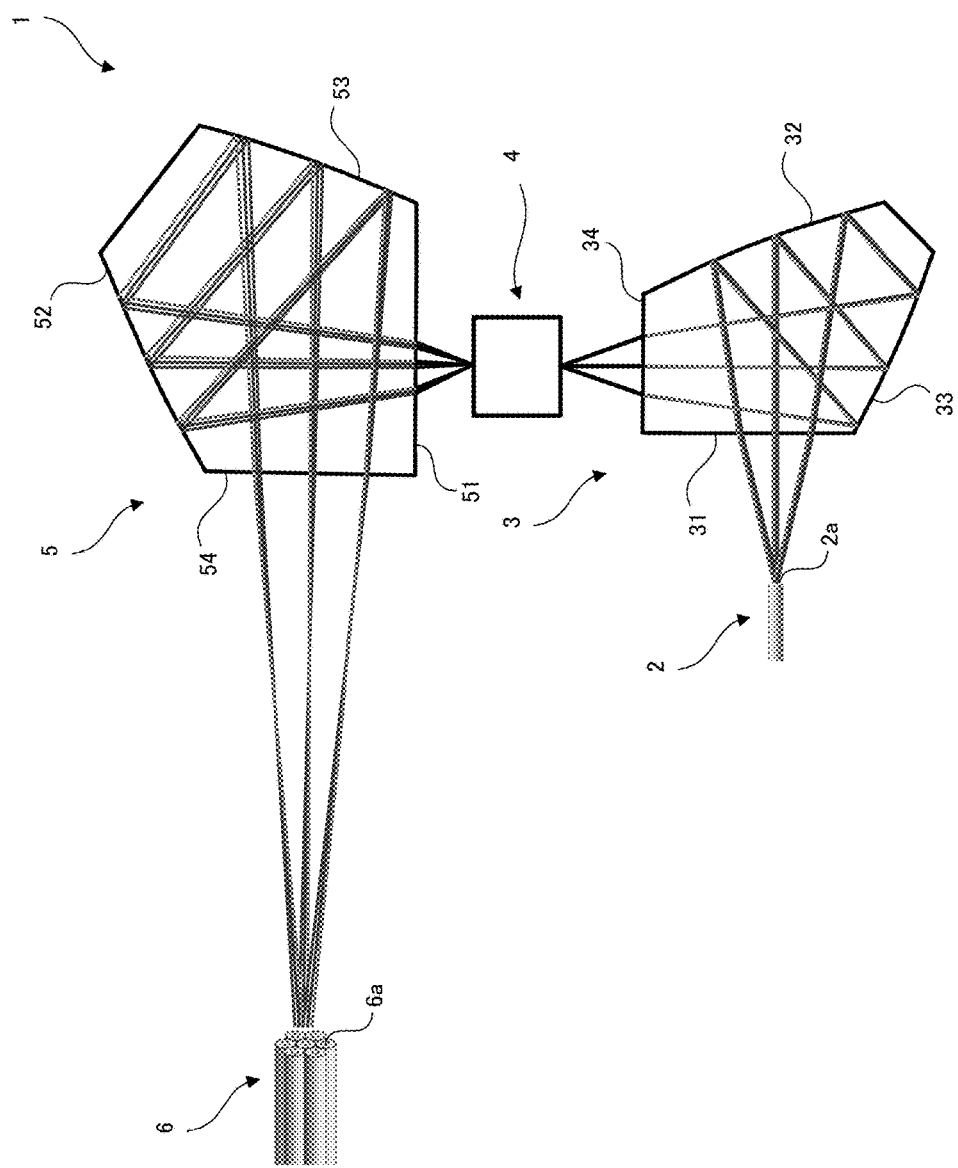
FIG. 1 is a sectional view of the optical system for optical communications according to one embodiment of the invention.
Figure 2:
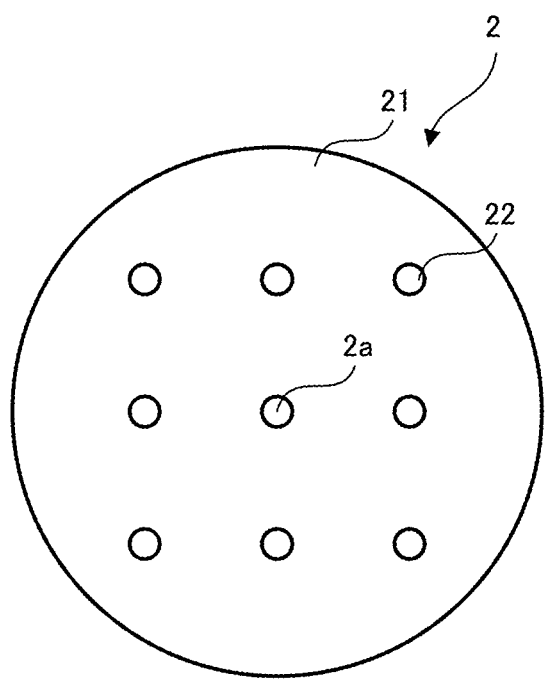
FIG. 2 is illustrative of a signal light exit portion in the optical system for optical communications according to one embodiment of the invention.
Figure 3:
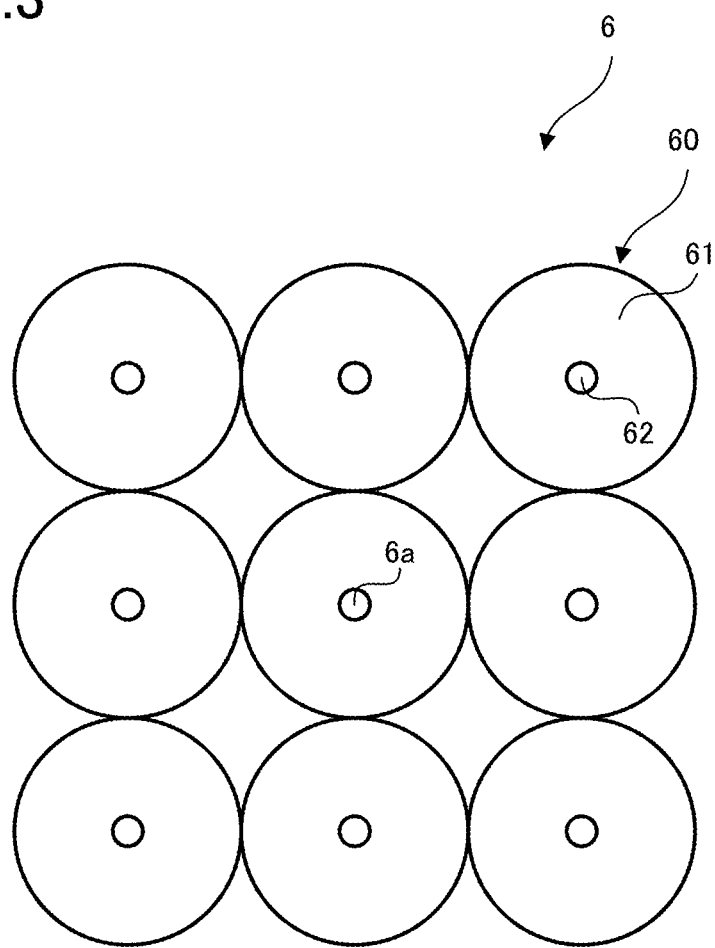
FIG. 3 is illustrative of a signal light-receiving portion in the optical system for optical communications according to one embodiment of the invention.

FIG. 1 is a sectional view of the optical system for optical communications according to one embodiment of the invention, and FIG. 2 is illustrative of a signal light exit portion in the optical system for optical communications according to one embodiment of the invention. FIG. 3 is illustrative of a signal light-receiving portion in the optical system for optical communications according to one embodiment of the invention.

The optical system 1 for optical communications according to the embodiment here comprises a signal light exit portion 2 adapted to exit signal light out from an exit end 2a, a first coupler optical system 3 that collects or condenses signal light from the exit end 2a to define a first coupling, a transfer portion 4 for transferring signal light from the first coupling to a second coupling, a second coupler optical system 5 that collects or condenses signal light from the second coupling to define a third coupling, and a signal light-receiving portion 6 that includes a light-receiving surface 6a in a position of the third coupling to receive signal light incident from the light-receiving surface 6a.

The signal light exit portion 2 is formed of or defined by a first optical fiber 2 that transmits signal light to exit the signal light out from the exit end 2a. The first optical fiber 2 here is formed of or defined by a multicore fiber 2 having a plurality of cores 22. In the multicore fiber 2 here, there are nine cores 22 within a cladding 21, as shown in FIG. 2, and independent signal light beams are propagated through the respective cores 22. A separation between the respective cores 22 is of the order of 50 μm.

The first coupler optical system 3 collects or condenses signal light from the exit end 2a to form or define the first coupling. The first coupler optical system 3 here comprises a prism that includes mutually de-centered entrance surface 31, first reflective surface 32, second reflective surface 33 and exit surface 34. Preferably, the first and second reflective surfaces 32 and 33 are each made up of a free-form surface. The prism is filled inside with optical plastics.

The transfer portion 4 transmits signal light from the first coupling to the second coupling. The detailed structure of the transfer portion 4 will be described later.

The second coupler optical system 5 collects or condenses signal light from the second coupling to define a third coupling. The second coupler optical system 5 here comprises a prism that includes mutually decentered entrance surface 51, first reflective surface 52, second reflective surface 53 and exit surface 54. Preferably, the first and second reflective surfaces 52 and 53 are each made up of a free-form surface. The prism is filled inside with optical plastics.

The signal light-receiving portion 6 is formed of or defined by a second optical fiber 6 that includes a light-receiving surface 6a in a position of the third coupling defined by the second coupler optical system 5 to receive signal light incident from the light-receiving surface 6a. The second optical fiber 6 includes a plurality of single-core fibers 60 each provided in such a way as to have an entrance end surface 6a in association with the coupling position of signal light exiting out from the exit end 2a of each of the cores 22 in the first optical fiber 2.

The second optical fiber 6 here is formed of or defined by nine single-core fibers 60. In the single-core fiber 6 here, as shown in FIG. 3, nine claddings 61, each one having a single core 62 inside, are coupled or assembled together to a single bundle, and an independent signal light beam is propagated through each core 62. A separation between the cores 62 is of the order of 125 μm.

The transfer component 4 is now explained.

FIG. 4 is a sectional view of the first example of the transfer portion 4.

The transfer portion 4 includes a first collimator optical system 41 that has positive refracting power and collimates signal light from the first coupling into parallel light, a signal light-operating portion 42 that includes an optical modulation optical element 42a capable of at least reflection of parallel light exiting out from the first collimator optical system 41 and is capable of operating optical signals, and a second collimator optical system 43 that has positive refracting power and collects parallel light reflected at the optical modulation optical element 42a to define the second coupling.

The first collimator optical system 41 is formed or defined by a first decentered optical system 41 including a reflective surface that tilts relative to the optical axis of incident signal light for reflection, and the second collimator optical system 43 is formed of or defined by a second decentered optical system 43 including a reflective surface that tilts relative to the optical axis of incident signal light for reflection. Preferably, the reflective surfaces are each formed of or defined by a concave reflective surface capable of internal reflection.

In the first transfer portion 4, the first collimator optical system 41 is formed of or defined by a first de-centered prism 41 that includes a concave reflective surface that tilts relative to the optical axis of incident signal light for internal reflection, and the second collimator optical system 43 is formed of or defined by a second decentered prism 43 that includes a concave reflective surface that tilts relative to the optical axis of incident signal light for internal reflection.

The first and second decentered prisms 41 and 43 are each made up of mutually decentered, three free-form surfaces, and filled inside with a plastic material. The first 41, and the second decentered prism 43 is sized in such a way as to be within the range of a cube having one side of 2 mm.

Figure 5A:
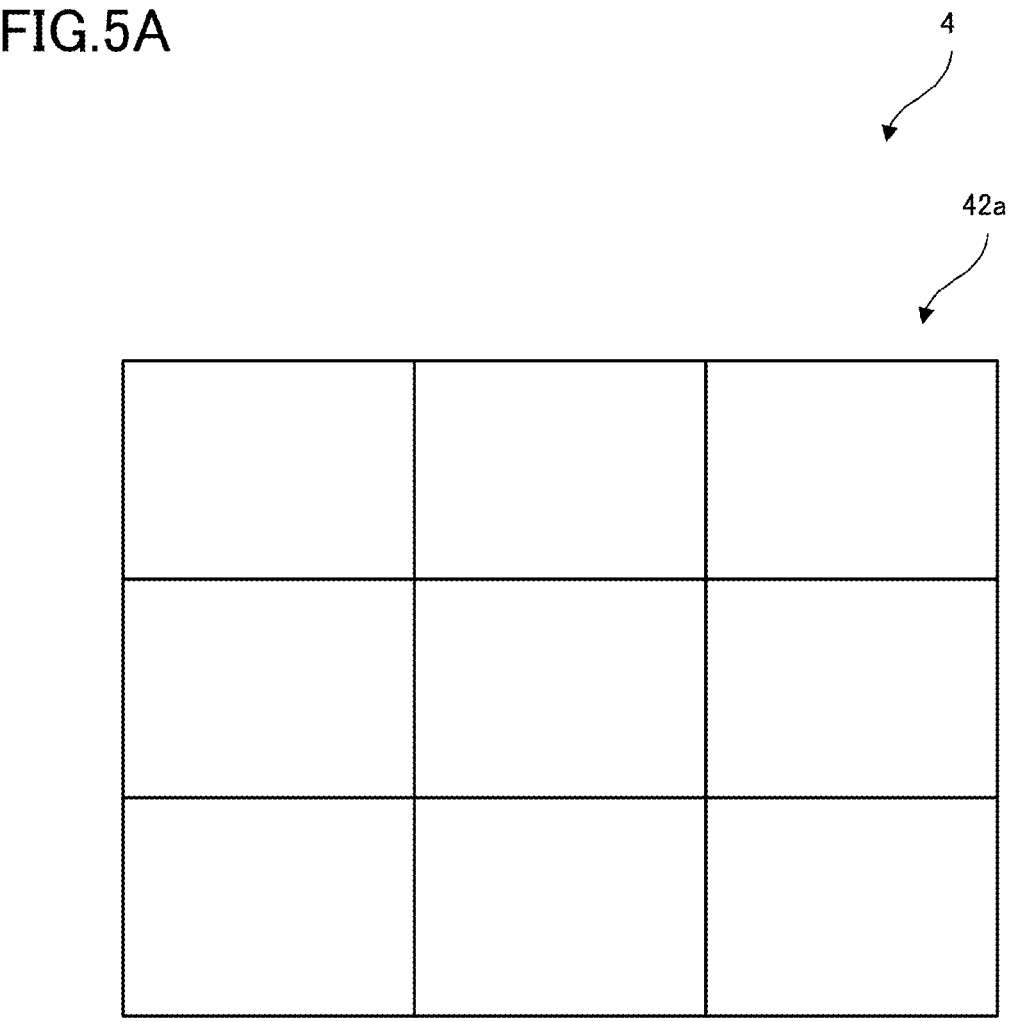
FIGS. 5A and 5B are illustrative of a first example of an optical modulation optical element according to one embodiment of the invention.
Figure 5B:
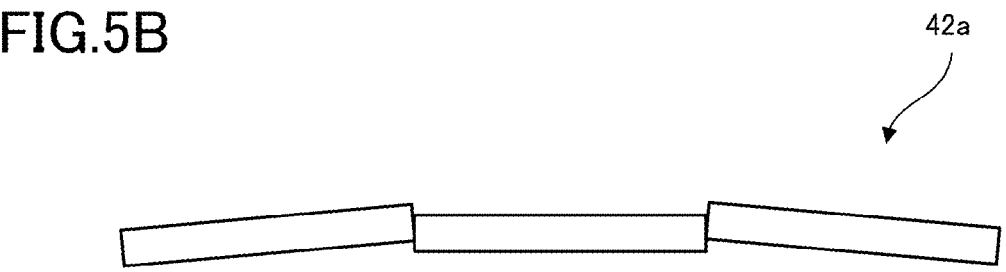

FIG. 5A and 5B are illustrative of the optical modulation optical element 42a: FIG. 5A and FIG. 5B are a plan view and a section view of the optical modulation optical element 42a, respectively.

The optical signal-operating portion 42 includes an optical modulation optical element 42a, an optical signal-receiving portion 42b, an optical signal-emitting portion 42c and a control portion 42d, and the optical modulation optical element 42a is connected to the control portion 42d.

The optical modulation optical element 42a is formed of or defined by an optical element 42a having variable optical characteristics or variable transmittance and reflectance. The optical element 42a having variable optical characteristics is an element such as a liquid crystal element or an electrochromic element that can be controlled by applied electric signals in terms of reflection or transmission. The optical element 42a with variable optical characteristics is formed of or defined by a liquid crystal on silicon (LCOS).

The optical element 42a with variable optical characteristics has a transmittance and reflectance that can be varied for each incident position of signal light exiting out from the exit end 2a of each of the cores of the first optical fiber 2. As shown typically in FIG. 5A, the optical element 42a with variable optical characteristics is divided in 9 segments, each of which has an angle of reflection that may be determined as desired, as shown in the sectional view of FIG. 5B. On the lower side of the optical element 42a with variable optical characteristics, shown in FIG. 5B, there are the first 41 and the second collimator optical system 43 of FIG. 4 located. Note here that there is no change in the once determined angle; only a changeover between transmission and reflection may be controlled by the control portion 42d for each incident position of signal light.

The optical signal-operating portion 42 includes, on the transmission side of the optical element 42a with variable optical characteristics, the optical signal-receiving portion 42b that receives signal light from the first collimator optical system 41 that has passed through the optical element 42a with variable optical characteristics. The optical signal-receiving portion 42b is formed of or defined by an optical fiber.

The optical signal-operating portion 42 also includes, on the transmission side of the optical element 42a with variable optical characteristics, the optical signal-emitting portion 42c that emits out signal light toward the second collimator optical system 43. This optical signal-emitting portion 42c is formed of or defined by an optical fiber.

With the optical signal-receiving portion 42 having such construction, it is possible to receive optical signals at the optical signal-receiving portion 42b and to emit out optical signals from the optical signal-emitting portion 42c as the optical element 42a with variable optical characteristics runs on the transmission mode. In other words, the optical signal-receiving portion 42b and signal-emitting portion 42c allow for add/drop operation of optical signals.

Light incident on the transfer portion 4 first enters the first decentered prism 41 forming the first collimator optical system 41 from the first transmission surface 41a and is reflected at the first reflective surface 41b and then at the second reflective surface 41a, exiting out from the second transmission surface 41c. Note here that S1 is indicative of a virtual pupil position. Light exiting out from the first collimator optical system 41 enters the optical signal-operating portion 42.

The light incident on the optical signal-operating portion 42 is reflected at the optical element 42a with variable optical characteristics as the optical element 42a runs on the reflection mode, exiting out from the optical signal-operating portion 42.

Exiting out from the optical signal-operating portion 42, the light enters the second decentered prism 43 that forms the second collimator system 43 from the first transmission surface 43a, and is reflected at the first reflective surface 43b and then at the second reflective surface 43c, exiting out from the second transmission surface 43b. Exiting out from the second collimator optical system 43, the light exits out from the transfer portion 4. Note here that S2 stands for a virtual pupil position.

The light incident on the optical signal-operating portion 4 transmits through the optical element 42a with variable optical characteristics, and there are optical signals received at the optical signal-receiving portion 42b as the optical element 42a runs on the transmission mode. The light emitted out from the optical signal-emitting portion 42c transmits through the optical element 42a, entering the second collimator system 43.

Figure 6:
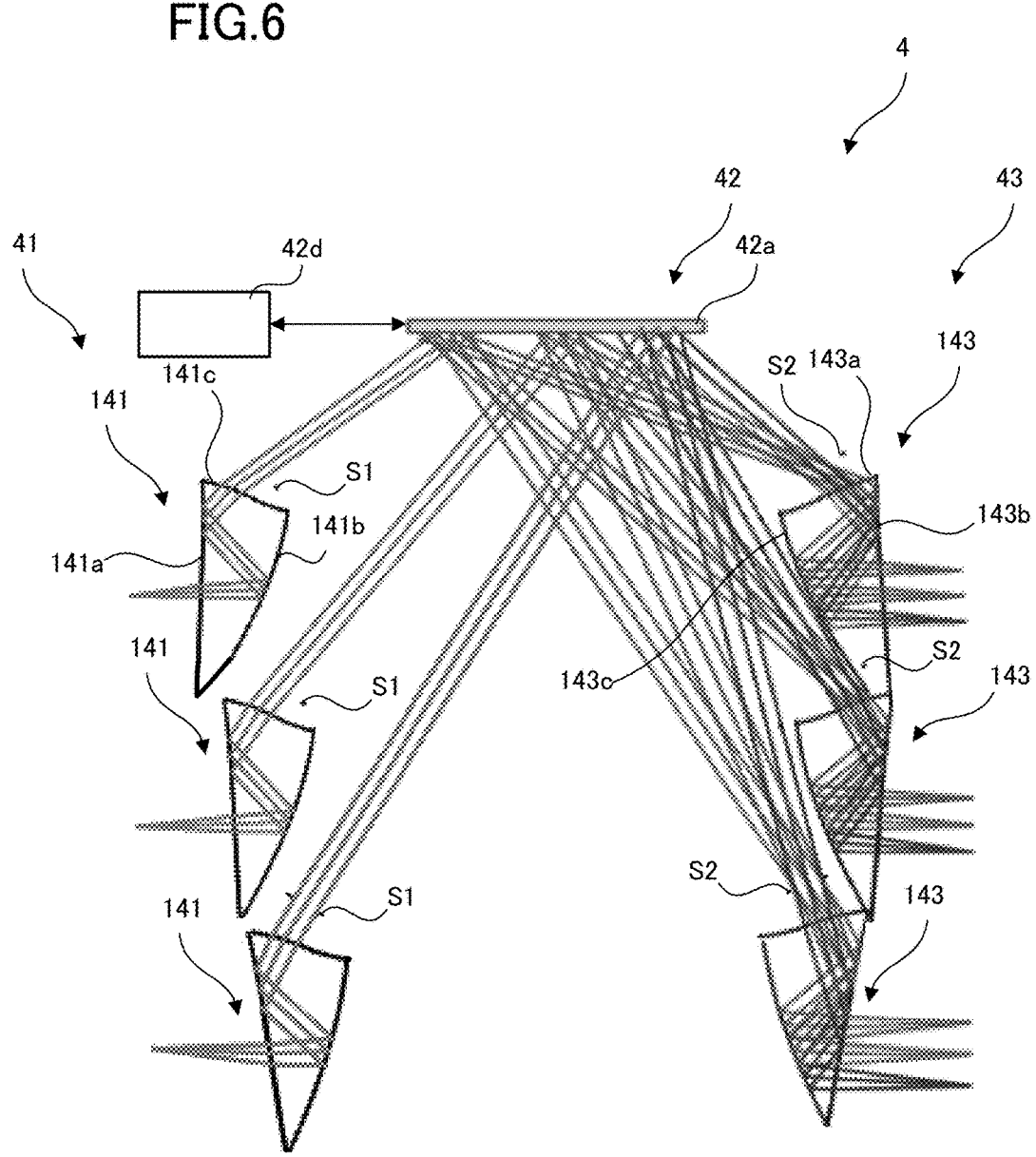
FIG. 6 is a sectional view of a second example of the transfer portion 4 according to the second embodiment of the invention.

FIG. 6 is a sectional view of the second example of the transfer portion 4.

The transfer portion 42 includes a first collimator optical system 41 that has positive refracting power and collimates signal light from the first coupling into parallel light, an optical signal-operating portion 42 that includes an optical modulation optical element 42a for at least reflection of parallel light exiting out from the first collimator optical system 41 and allows for operation of optical signals, and a second collimator optical system 43 that has positive refracting power and collects or condenses parallel light reflected at the optical modulation optical element 42a to define a second coupling.

The first collimator optical system 41 is formed of or defined by a first decentered prisms array comprising a plurality of first decentered prisms 141 arranged in place. A plurality of first decentered prisms 141 in the first decentered prism array 41 are individually arranged in association with signal light beams exiting out from the cores 22 of the first optical fiber 2, and give out parallel light toward the optical modulation optical element 42.

That is, a plurality of first decentered prisms 141 in the first collimator optical system 41 are formed of or defined by a plurality of first decentered prisms 141 having angles of the outgoing optical axes different with respect to the incoming optical axes of signal light beams so that a plurality of parallel light beams are put together toward the optical modulation optical element 42.

The first collimator optical system 41 of the second example here is made up of three by three or nine first decentered prisms 141, and has three patterns: vertically different specifications and horizontally identical specifications. Preferably, the respective first prisms 141 are spaced about 60 μm away from one another.

The second collimator optical system 43 is formed of or defined by a second decentered prism array 43 comprising a plurality of second decentered prisms 143 arranged in place, and a plurality of second decentered prisms 143 in the second decentered prism array 43 are arranged in positions where signal light enters in association with a changeover of the angle of reflection of the optical modulation optical element 42a.

The second collimator optical system 43 of the second example here comprises three by three or nine second decentered prisms 143 and has three patterns: vertically different specifications and horizontally identical specifications. Preferably, the respective second decentered prisms 143 are spaced about 60 μm away from one another.

The first decentered prism array 41 that forms or defines the first collimator optical system 41 may be provided as first decentered prisms 141 having nine patterns: vertically and horizontally different specifications. The second decentered prism array 43 that forms or defines the second collimator optical system 43 may be provided as second decentered prisms 143 having nine patterns: vertically and horizontally different specifications. Further, the respective prism arrays 41 and 43 may be formed of or defined by four by four or sixteen decentered prisms.

FIG. 7 is illustrative of the optical modulation optical element 42a of the second example.

The optical modulation optical element 42a is formed of or defined by an MEMS (Micro Electro Mechanical Systems) mirror 142a capable of making an angle-of-reflection changeover. The MEMS mirror 142a makes an angle-of-reflection changeover, thereby making a selective changeover between signal light beams guided to the second optical fiber 6.

The optical modulation optical element 42a of the second example here is constructed of or defined by an MEMS mirror array 42a in which a plurality of MEMS mirrors 142a capable of making an angle-of-reflection changeover are arranged, and a plurality of MEMS mirrors 142a in the MEMS mirror array 42a are each located in association with signal light exiting out from the exit end 2a of each core 22 in the first optical fiber 2 shown in FIG. 2. An independent changeover between the angles of reflection of the MEMS mirrors 142a makes it possible to selectively guide signal light from each core 22 in the first optical fiber 2 to the core 62 of each single core fiber 60 in the second optical fiber 6 shown in FIG. 3.

The light, if incident from any of the first de-centered prisms 141 in the first collimator optical system 41, may then be given out toward the desired second de-centered prism 143 in the second collimator optical system 43.

While transfer of optical signals from the first optical fiber 2 that forms the multicore fiber 2 to the second optical fiber 6 comprising a bundle of the single-core fibers 60 has been explained in the embodiment here, it is understood that there may be vice versa: the optical signals may be transferred from the second optical fiber 6 comprising a bundle of single-core fibers 60 to the first optical fiber 2 that forms the multicore fiber 2. Instead of the multicore fiber 2 and the bundle of single-core fibers 60, use may also be made of a light source such as laser or LEDs as well as a light-receiving element such as a photodiode.

As described above, the optical system 1 for optical communications according to the embodiments here is of small-format size and light in weight and capable of coupling a signal light exit portion to a signal light-receiving portion for operation of optical signals.

While some embodiments of the invention have been explained, it is understood that the invention is by no means limited to them; suitable combinations of their constructions or arrangements are also encompassed in the scope of the invention.

REFERENCE SIGNS LIST

1: Optical system for optical communications
2: First optical fiber (signal light exit portion)
3: First coupler optical system
4: Transfer portion
41: First collimator optical system, first decentered optical system, or first decentered prism
141: First decentered prism
42: Optical signal-operating portion
42a: Optical modulation optical element (optical element having variable optical characteristics, MEMS mirror or LCOS)
43: Second collimator optical system, second decentered optical system, or second decentered prism
143: Second decentered prism
5: Second coupler optical system
6: Second optical fiber (signal light-receiving portion)

The invention claimed is:

1. An optical system for optical communications comprising:
a signal light exit portion having an exit end from which signal light exits out,
a first coupler optical system that collects signal light from the exit end to define a first coupling,
a first collimator optical system that has positive refracting power and collimates signal light from the first coupling into parallel light,
an optical signal-operating portion that includes a optical modulation optical element that at least reflects parallel light exiting out from the first collimator optical system and is capable of operation of optical signals,
a second collimator optical system that has positive refracting power and collects parallel light reflected at the optical modulation optical element to define a second coupling,
a second coupler optical system that collects signal light from the second coupling to define a third coupling, and
a signal light-receiving portion that includes a light-receiving surface in a position of the third coupling defined by the second coupler optical system and receives the signal light incident from the light-receiving surface, wherein:
the first collimator optical system is defined by a decentered optical system that includes a reflective surface that tilts with respect to an optical axis of incident signal light and is capable of reflection, and
the second collimator optical system is defined by a second decentered optical system that includes a reflective surface that tilts with respect to an optical axis of incident signal light and is capable of reflection.

2. The optical system for optical communications according to claim 1, wherein
the reflective surface of the first decentered optical system is a concave reflective surface that tilts with respect to an optical axis of incident signal light and is capable of internal reflection, and
the reflective surface of the second decentered optical system is a concave reflective surface that tilts with respect to an optical axis of incident signal light and is capable of internal reflection.

3. The optical system for optical communications according to claim 1, wherein
the first decentered optical system comprises a first decentered prism that includes a concave reflective surface as the reflective surface that tilts with respect to an optical axis of incident signal light and is capable of internal reflection, and
the second decentered optical system comprises a second decentered prism that includes a concave reflective surface as the reflective surface that tilts with respect to an optical axis of incident signal light and is capable of internal reflection.

4. The optical system for optical communications according to claim 3, wherein the first de-centered prism, and the second decentered prism is sized in such a way as to fall within a range of a cube having one size of 2 mm.

5. The optical system for optical communications according to claim 3, wherein
the signal light exit portion is defined by a first optical fiber that transmits signal light and exits the signal light out from an exit end, and
the signal light-receiving portion is defined by a second optical fiber that includes an entrance end surface in a position of the third coupling defined by the second coupler optical system for transmission of the signal light incident from the entrance end surface.

6. The optical system for optical communications according to claim 5, wherein
the optical modulation optical element is defined by an optical element with variable optical characteristics: transmittance and reflectance.

7. The optical system for optical communications, according to claim 3, wherein:
the signal light exit portion is defined by a first optical fiber that transmits signal light and exits the signal light out from an exit end,
the signal light-receiving portion is defined by a second optical fiber that includes an entrance end surface in a position of the third coupling defined by the second coupler optical system and transmits the signal light incident from the entrance end surface,
the optical modulation optical element is defined by an MEMS mirror capable of making an angle-of-reflection changeover,
the second collimator optical system is defined by a decentered prism array in which a plurality of the second decentered prisms are arranged,
a plurality of decentered prisms in the decentered prism array are arranged in positions where signal light enters in association with a changeover of angles of reflection of the MEMS mirror, and the second optical fiber comprises a plurality of single-core fibers located in association with the respective decentered prisms on which signal light is incident.

8. The optical system for optical communications according to claim 3, wherein:
the signal light exit portion is defined by a first optical fiber that transmits signal light and exits the signal light out from an exit end,
the signal light-receiving portion is defined by a second optical fiber that includes an entrance end surface in a position of the third coupling defined by the second coupler optical system and transmits the signal light incident from the entrance end surface,
the first optical fiber is defined by a plurality of single-core fibers or a multicore fiber including a plurality of cores,
the first collimator optical system is defined by a decentered prism array in which a plurality of the first decentered prisms are arranged,
a plurality of decentered prisms in the decentered prism array are individually located in association with signal light beams exiting out from exit ends of the respective cores of the first optical fibers, and emit out parallel light toward the optical modulation optical element,
the optical modulation optical element includes an MEMS mirror capable of making an angle-of-reflection changeover, and
the MEMS mirror makes an angle-of-reflection changeover thereby making a selective changeover between signal light beams guided to the second optical fiber.

9. The optical system for optical communications according to claim 3, wherein:
the signal light exit portion is defined by a first optical fiber that transmits signal light and exits the signal light out from an exit end,
the signal light-receiving portion is defined by a second optical fiber that includes an entrance end surface in a position of the third coupling defined by the second coupler optical system and transmits the signal light incident from the entrance end surface,
the first optical fiber is defined by a plurality of single-core fibers or a multicore fiber including a plurality of cores,
the first collimator optical system is defined by a decentered prism array in which a plurality of the first decentered prisms are arranged,
a plurality of decentered prisms in the decentered prism array are individually located in association with signal light beams exiting out from exit ends of the respective cores of the first optical fibers, and emit out parallel light toward the optical modulation optical element,
the optical modulation optical element includes an MEMS mirror capable of making an angle-of-reflection changeover,
the second collimator optical system is defined by a decentered prism array in which a plurality of the second decentered prisms are arranged,
a plurality of decentered prisms in the decentered prism array are arranged in positions where signal light enters in association with an angle-of-reflection changeover by the MEMS mirror, and
the second optical fiber includes a plurality of single-core fibers located in association with the respective decentered prisms on which signal light is incident.

10. The optical system for optical communications according to claim 9, wherein:

the optical modulation optical element is defined by an MEMS mirror array having a plurality of MEMS mirrors capable of making an angle-of-reflection changeover,
a plurality of MEMS mirrors in the MEMS mirror array are located in association with signal light exiting out from an exit end of each core of the first optical fiber, and
an independent changeover between angles of reflection of the respective MEMS mirrors is so made that optical signals from the respective cores of the first optical fiber are selectively changed over and guided to the cores of the respective single-core fibers of the second optical fiber.

11. The optical system for optical communications according to claim 8, wherein a plurality of decentered prisms in the first collimator optical system are defined by a plurality of decentered prisms in which an angle of an outgoing optical axis of signal light differs from an angle of an incoming optical axis of signal light, and a plurality of parallel light beams are put together toward the optical modulation optical element.

12. The optical system for optical communications according to claim 8, wherein a plurality of decentered prisms in the second collimator optical system are defined by a plurality of decentered prisms in which an angle of an outgoing optical axis of signal light differs from an angle of an incoming optical axis of signal light.

13. An optical system for optical communications comprising:
a signal light exit portion having an exit end from which signal light exits out,
a first coupler optical system that collects signal light from the exit end to define a first coupling,
a first collimator optical system that has positive refracting power and collimates signal light from the first coupling into parallel light,
an optical signal-operating portion that includes an optical modulation optical element that at least reflects parallel light exiting out from the first collimator optical system and is capable of operation of optical signals,
a second collimator optical system that has positive refracting power and collects parallel light reflected at the optical modulation optical element to define a second coupling,
a second coupler optical system that collects signal light from the second coupling to define a third coupling, and
a signal light-receiving portion that includes a light-receiving surface in a position of the third coupling defined by the second coupler optical system and receives the signal light incident from the light-receiving surface, wherein:
the signal light exit portion is defined by a first optical fiber that transmits signal light and exits the signal light out from an exit end,
the signal light-receiving portion is defined by an optical fiber that includes an entrance end surface in a position of the third coupling defined by the second coupler optical system and transmits the signal light incident from the entrance end surface, and
the optical modulation optical element is defined by an optical element with variable optical characteristics: transmittance and reflectance.

14. The optical system for optical communications according to claim 13, wherein
on a transmission side of the optical element with variable optical characteristics there is another optical signal-receiving portion included for receiving signal light from the first collimator optical system that has transmitted through the optical element with variable optical characteristics.

15. The optical system for optical communications according to claim 14, wherein
the another optical signal-receiving portion is defined by an optical fiber.

16. The optical system for optical communications according to claim 13, wherein on a transmission side of the optical element with variable optical characteristics there is an optical signal-emitting portion included that emits out signal light toward the second collimator optical system.

17. The optical system for optical communications according to claim 16, wherein
the optical signal-emitting portion is defined by an optical fiber.

18. The optical system for optical communications according to claim 13, wherein the optical element with variable optical characteristics is defined by an LCOS.

19. The optical system for optical communications according to claim 13, wherein
the first optical fiber is defined by a plurality of single-core fibers or a multicore fiber having a plurality of cores, and
the optical element with variable optical characteristics is variable in terms of transmittance and reflectance for each entrance position of signal light exiting out from an exit end of each core of the first optical fiber.

20. The optical system for optical communications according to claim 19, wherein:
on a transmission side of the optical element with variable optical characteristics and in association with an entrance position of the signal light, there are a plurality of optical signal-receiving portions included that receive signal light from the first collimator optical system that has transmitted through the optical element with variable optical characteristics.

21. The optical system for optical communications according to claim 20, wherein
the plurality of optical signal-receiving portions are each defined by an optical fiber.

22. The optical system for optical communications according to claim 19, wherein
on a transmission side of the optical element with variable optical characteristics and in association with an entrance position of the signal light, there are a plurality of optical signal-emitting portions included that emit out signal light toward the second collimator optical system.

23. The optical system for optical communications according to claim 22, wherein
the plurality of optical signal-emitting portions are each defined by an optical fiber.

24. The optical system for optical communications according to claim 19, wherein the second optical fiber comprises a plurality of single-core fibers that are each provided in such a way as to have an entrance end surface in association with a coupling position of signal light exiting out from an exit end of each core of the first optical fiber.

* * * * *